United States Patent
Seacat (10) Patent No.: US 8,214,891 B2
(45) Date of Patent: Jul. 3, 2012

(54) USING MULTI-TOUCH GESTURES TO PROTECT SENSITIVE CONTENT USING A COMPLETELY AUTOMATED PUBLIC TURING TEST TO TELL COMPUTERS AND HUMANS APART (CAPTCHA)

(75) Inventor: Lisa Anne Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 925 days.

(21) Appl. No.: 12/055,923

(22) Filed: Mar. 26, 2008

(65) Prior Publication Data

US 2009/0249476 A1    Oct. 1, 2009

(51) Int. Cl.
   *G06F 21/00*       (2006.01)
(52) U.S. Cl. .......................................................... 726/17
(58) Field of Classification Search .................... 726/17
   See application file for complete search history.

(56) References Cited

U.S. PATENT DOCUMENTS

| | | | | |
|---|---|---|---|---|
| 2004/0199597 A1* | 10/2004 | Libbey et al. | ................. | 709/207 |
| 2006/0026535 A1 | 2/2006 | Hotelling et al. | ............. | 715/863 |
| 2006/0287963 A1* | 12/2006 | Steeves et al. | ................ | 705/64 |
| 2007/0152984 A1* | 7/2007 | Ording et al. | ................. | 345/173 |
| 2007/0192849 A1* | 8/2007 | Golle et al. | ....................... | 726/16 |
| 2008/0092245 A1* | 4/2008 | Alward et al. | ................... | 726/28 |
| 2008/0163130 A1* | 7/2008 | Westerman | .................... | 715/863 |
| 2008/0278455 A1* | 11/2008 | Atkins et al. | ................... | 345/173 |
| 2009/0083847 A1* | 3/2009 | Fadell et al. | ..................... | 726/16 |
| 2009/0083850 A1* | 3/2009 | Fadell et al. | ..................... | 726/19 |
| 2009/0085877 A1* | 4/2009 | Chang et al. | ................... | 345/173 |
| 2009/0235327 A1* | 9/2009 | Jakobsson et al. | ................. | 726/2 |
| 2009/0237363 A1* | 9/2009 | Levy et al. | ..................... | 345/173 |

OTHER PUBLICATIONS

Microsoft Launches New Product Category: Surface Computing Comes to Life in Restaurants, Hotels, Retail Location and Casino Resorts, Microsoft Press Pass, May 29, 2007, http://www.microsoft.com/presspass/press/2007/may07/05-29MSSurfacePR.mspx.

* cited by examiner

*Primary Examiner* — Michael S McNally
(74) *Attorney, Agent, or Firm* — VanLeeuwen & VanLeeuwen (57) ABSTRACT

The invention described herein uses a multi-touch manager for authorizing multi-touch devices by first providing a multi-touch test to a multi-touch device. In turn, the multi-touch manager receives a multi-touch response from the multi-touch device. The multi-touch manager then compares the multi-touch response with a multi-touch answer and authorizes the device based upon the comparison.

14 Claims, 10 Drawing Sheets

USING MULTI-TOUCH GESTURES TO PROTECT SENSITIVE CONTENT USING A COMPLETELY AUTOMATED PUBLIC TURING TEST TO TELL COMPUTERS AND HUMANS APART (CAPTCHA)

BACKGROUND OF THE INVENTION

1. Technical Field

The present invention relates to a system and method for authorizing a user utilizing a multi-touch device by providing multi-touch tests to the user that instructs the user to perform gestures that include contacting the multi-touch device in at least two locations.

2. Description of the Related Art

Multi-touch devices may include a computerized surface that uses cameras and near-infrared light to identify objects placed upon it and to allow simultaneous multiple points of touch interaction. Multi-touch device users use computer networks, such as the Internet, and other applications that utilize a security feature for determining whether a human or Spam robot is requesting information. For example, Completely Automated Public Turning test to tell Computers and Humans Apart (CAPTCHA) is this type of security feature that instructs a user to enter a response based upon viewing an image. The invention described herein utilizes unique multi-touch device capabilities in order to determine whether a human is requesting information.

SUMMARY

It has been discovered that the aforementioned challenges are resolved using a multi-touch manager that provides a multi-touch test to a multi-touch device. In turn, the multi-touch manager receives a multi-touch response from the multi-touch device. Next, the multi-touch manager compares the multi-touch response with a multi-touch answer and authorizes the device based upon the comparison.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
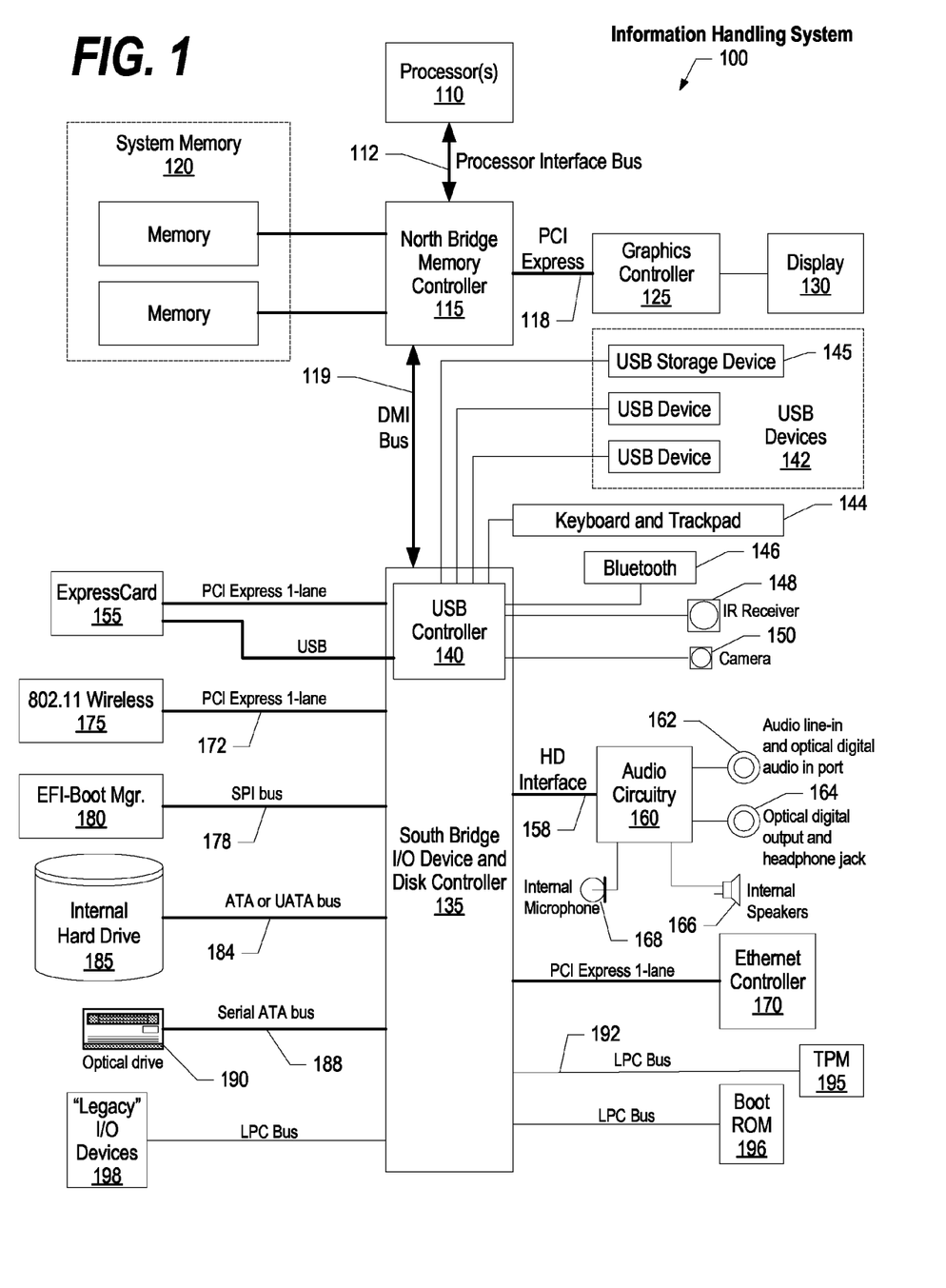
FIG. 1 is a block diagram of a data processing system in which the methods described herein can be implemented.
Figure 2:
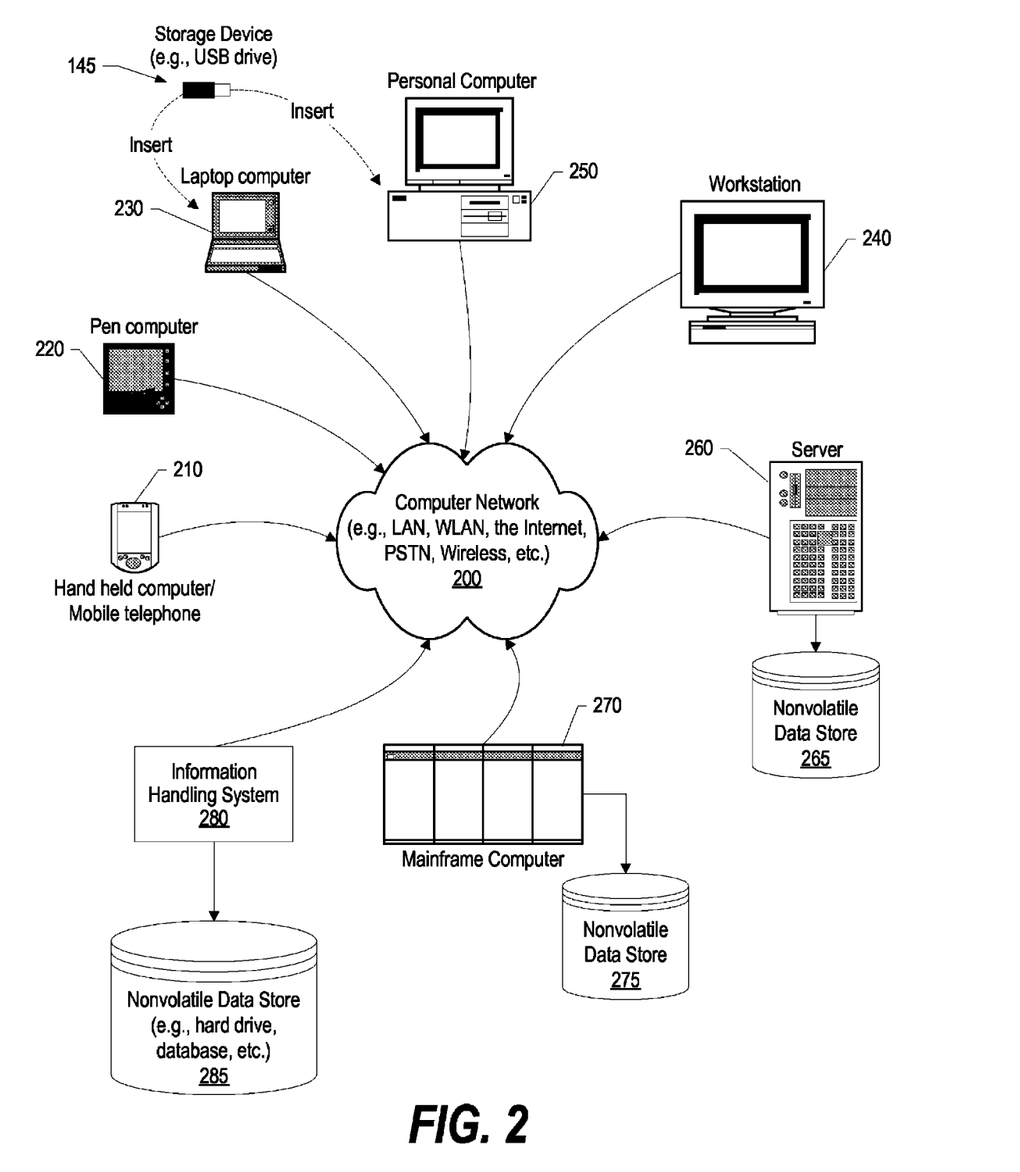
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, removable nonvolatile storage device 145 can be shared amongst two or more information handling systems using various techniques, such as connecting the removable nonvolatile storage device 145 to a USB port or other connector of the information handling systems.

Figure 3:
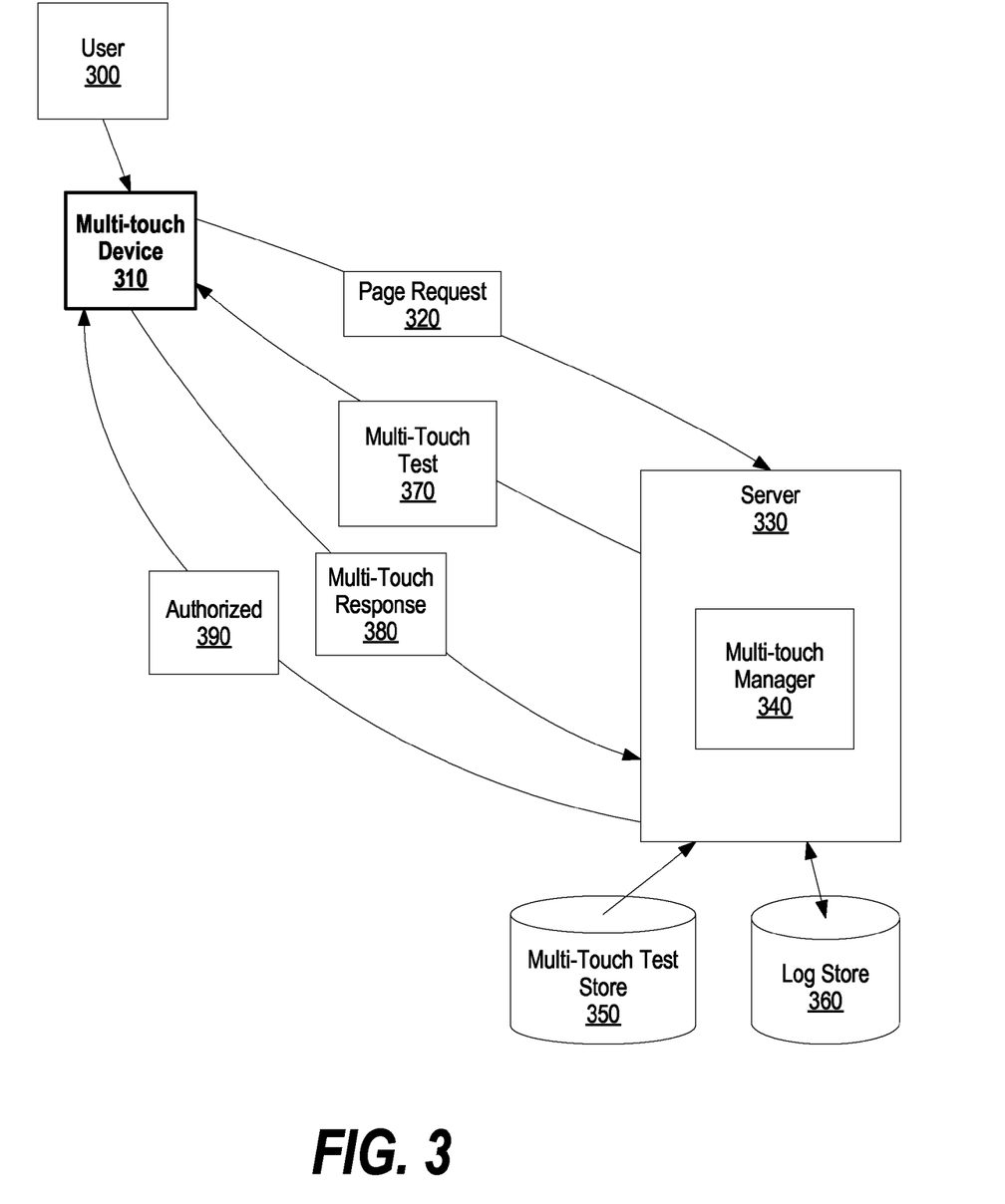
FIG. 3 is a diagram of a server providing a multi-touch test to a multi-touch device and authorizing the multi-touch device based upon a user's response.

FIG. 3 is a diagram of a server providing a multi-touch test to a multi-touch device and authorizing the multi-touch device based upon a user's response. User 300 uses multi-touch device 310 for computing functions, such as accessing pages of data located on a computer network such as the Internet. Many pages of data incorporate a security feature that determines whether a human or a Spam robot is requesting information. For example, Completely Automated Public Turning test to tell Computers and Humans Apart (CAPTCHA) is one such security mechanism.

When user 300 wishes to access a page of data, multi-touch device 310 sends page request 320 to server 330. Server 330 includes multi-touch manager 340, which supports multi-touch devices by providing multi-touch tests and analyzing multi-touch responses. When server 330 receives page request 320, multi-touch manager 340 pseudo-randomly selects a multi-touch test from multi-touch test store 350. The multi-touch test is a test that instructs a user to perform specific multi-touch gestures, such as touching a screen at two locations and zooming in on an object or rotating an object (see FIGS. 8-10 and corresponding text for further details). Multi-touch test store 350 may be stored on a nonvolatile storage area, such as a computer hard drive.

Once multi-touch manager 340 selects a multi-touch test, multi-touch manager logs the test (e.g., a test identifier) in log store 360 and sends multi-touch test 370 to multi-touch device 310. In turn, multi-touch device 310 provides the multi-touch test to user 300, in which case user 300 performs instructed gestures on multi-touch device 310 in order to produce a multi-touch response. Multi-touch response 380 is then sent to server 330. In one embodiment, multi-touch response 380 may include user 300's gesture information such as XNY coordinate data. For example, the multi-touch response may specify that user 300 started at coordinates 3,45 (first point) and 60,145 (second point), and moved inward to 15, 60 and 45, 100, respectively. In another embodiment, multi-touch response 380 may include a resulting image after user 300's gestures, such as a rotated image or a zoomed-in image. Log store 360 may be stored on a nonvolatile storage area, such as a computer hard drive.

Multi-touch manager 340 compares multi-touch response 380 with a multi-touch answer and, in one embodiment, using multi-touch answer parameters. For example, the multi-touch answer parameters may allow a user to rotate a picture between 85 and 95 degrees instead of exactly 90 degrees. When multi-touch response 380 passes, server 330 sends authorized 390 to multi-touch device 310. When multi-touch response 380 fails, multi-touch manager 340 may provide another multi-touch test to multi-touch device 310 up to a certain number of times, such as three tests (see FIG. 4 and corresponding text for further details).

Figure 4:
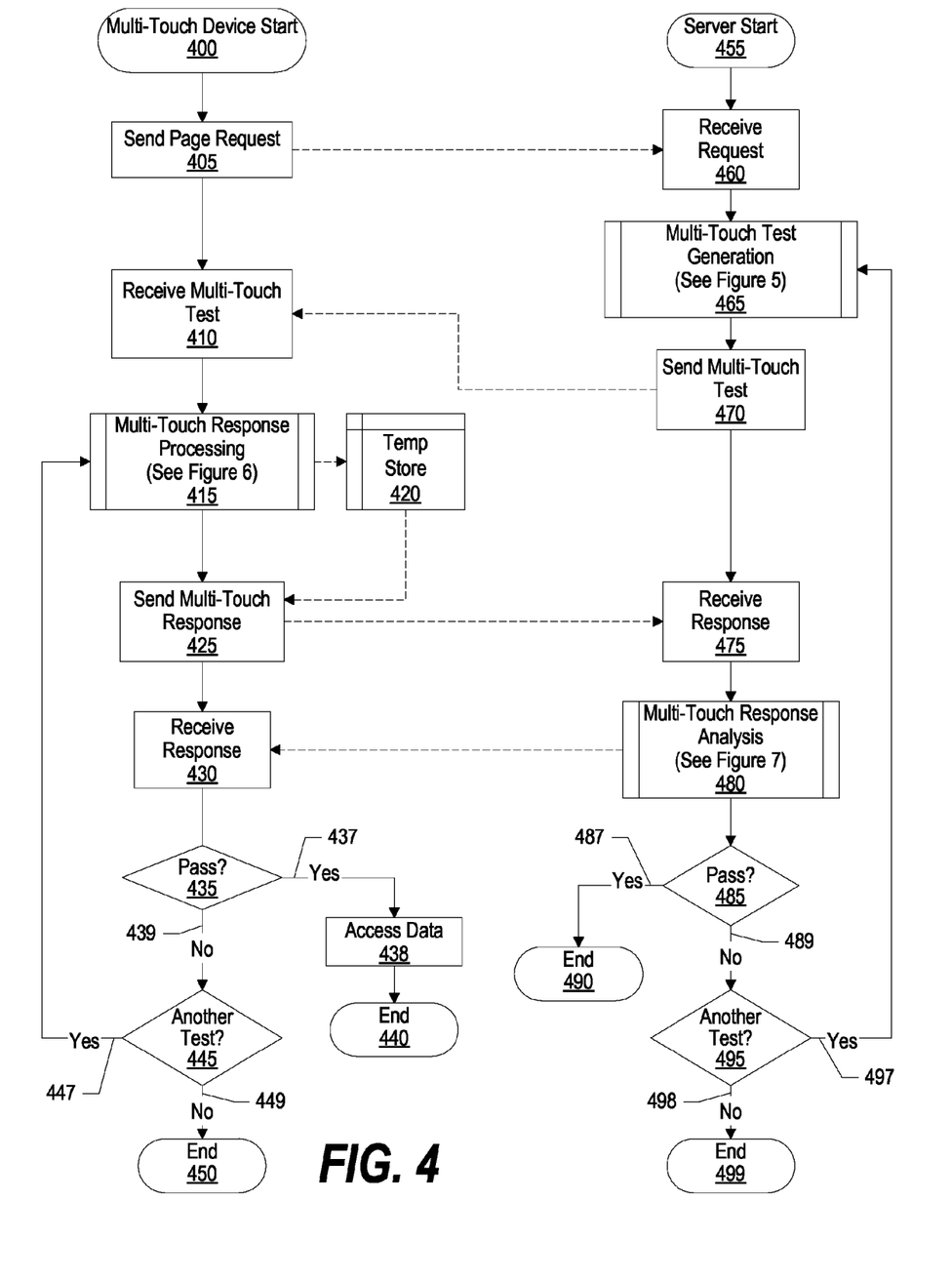
FIG. 4 is a high-level flowchart showing steps taken in a server authorizing a multi-touch device using a multi-touch test.

FIG. 4 is a high-level flowchart showing steps taken in a server authorizing a multi-touch device using a multi-touch test. Multi-touch device processing commences at 400, whereupon the multi-touch device sends a page request to a server at step 405.

Server processing commences at 455, whereupon the server receives the page request at step 460. In turn, the server pseudo-randomly selects a multi-touch test to send to the multi-touch device. For example, the multi-touch test may correspond to a Completely Automated Public Turing test to tell Computers and Humans Apart (CAPTCHA) format. The server may log the selected multi-touch test using a device identifier or user identifier in the event that the device's user fails the multi-touch test and the server is requested to send another multi-touch test (pre-defined process block 465, see FIG. 5 and corresponding text for further details). At step 470, the server send the multi-touch test to the device.

Figure 6:
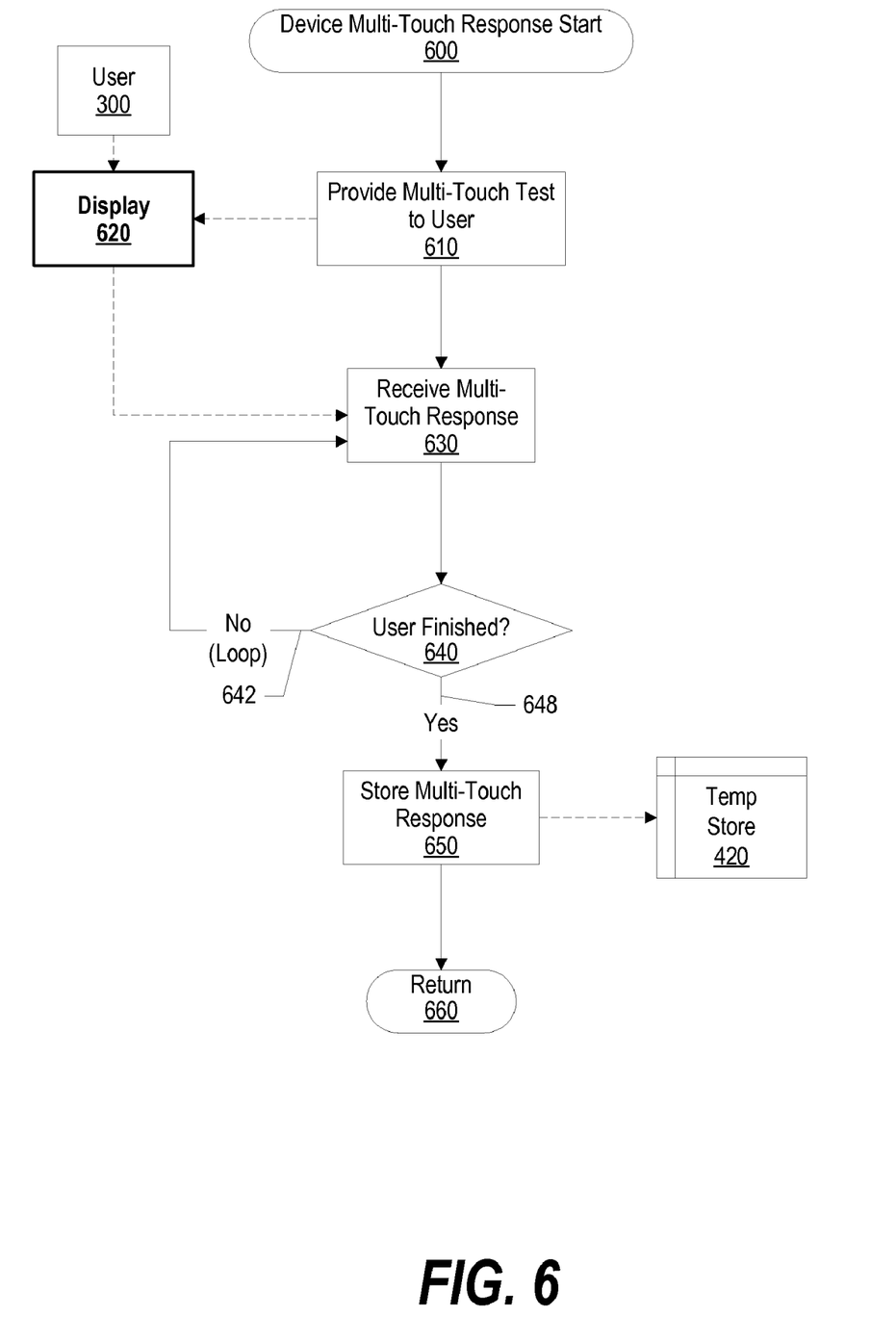
FIG. 6 is a flowchart showing steps taken in a multi-touch device providing a multi-touch test to a user and receiving a multi-touch response from the user.

The device receives the multi-touch test at step 410, whereupon the device provides the multi-touch test to a user and, in turn, receives a multi-touch response from the user, which is stored in temporary store 420 (pre-defined process block 415, see FIG. 6 and corresponding text for further details). The user's multi-touch response includes the user contacting a display at multiple locations. The user's multi-touch response may also include the user performing gestures, such as zooming in on an object or rotating an object (see FIGS. 8-10 and corresponding text for further details). At step 425, the multi-touch device sends the user's response to the server.

Figure 7:
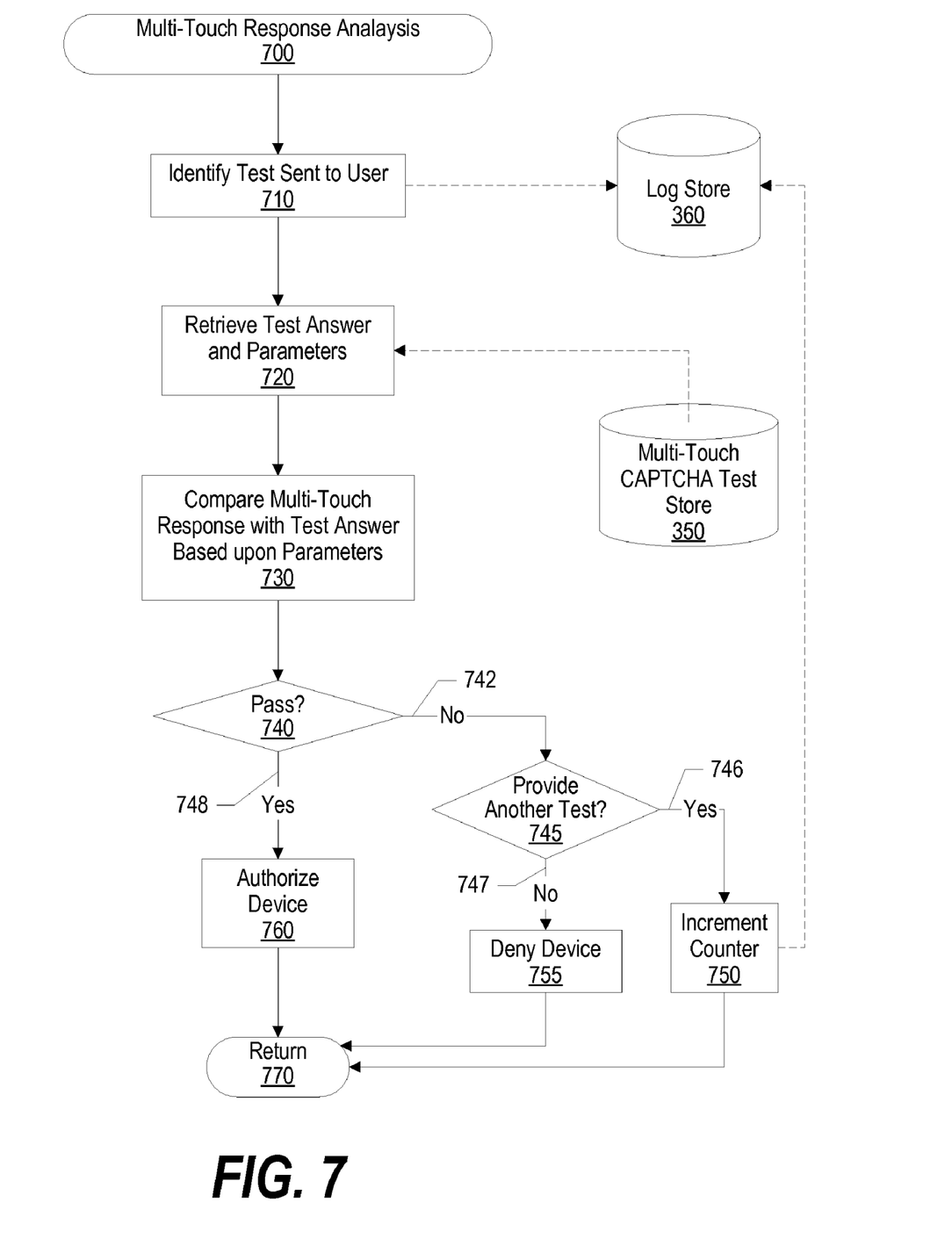
FIG. 7 is a flowchart showing steps taken in a server analyzing a multi-touch response and determining whether to authorize the device based upon a multi-touch answer.

The server receives the multi-touch response at step 475, whereupon the server compares the multi-touch response with a multi-touch answer and provides a pass/fail/retest result back to the multi-touch device (pre-defined process block 480, see FIG. 7 and corresponding text for further details). In one embodiment, the server uses multi-touch answer parameters in its comparison, which provide an acceptable range of the user's response. For example, if the user is instructed to rotate an object 90 degrees, the multi-touch test parameters may allow the user to rotate the object between 85 and 95 degrees.

A determination is made at the server as to whether the multi-touch response passed (decision 485). If the multi-touch response passed, decision 485 branches to "Yes" branch 487 whereupon processing ends at 490. On the other hand, if the multi-touch response did not pass, decision 485 branches to "No" branch 489 whereupon a determination is made as to whether to provide another multi-touch test to the multi-touch device (decision 495). For example, the server may provide up to three different multi-touch tests to the device.

If the server should provide another test, decision 495 branches to "Yes" branch 497, which loops back to provide another multi-touch test to the multi-touch device. This looping continues until the server should not provide more tests to the multi-touch device, at which point decision 495 branches to "No" branch 498 whereupon server processing ends at 499.

On the device side, the multi-touch device receives the result at step 430. A determination is made as to whether the multi-touch response passed (decision 435). If the multi-touch response passed, decision 435 branches to "Yes" branch 437 whereupon the multi-touch devices access the requested page of data (step 438) and processing ends at 440.

On the other hand, if the multi-touch response did not pass, decision 435 branches to "No" branch 439 whereupon a determination is made as to whether the server is providing another multi-touch test (decision 445). For example, the server may provide up to three multi-touch tests to a particular device. If the server is providing another multi-touch test, decision 445 branches to "Yes" branch 447, which loops back to process the next multi-touch test. This looping continues until the server does not send another multi-touch test, at which point decision 445 branches to "No" branch 449 whereupon multi-touch device processing ends at 450.

Figure 5:
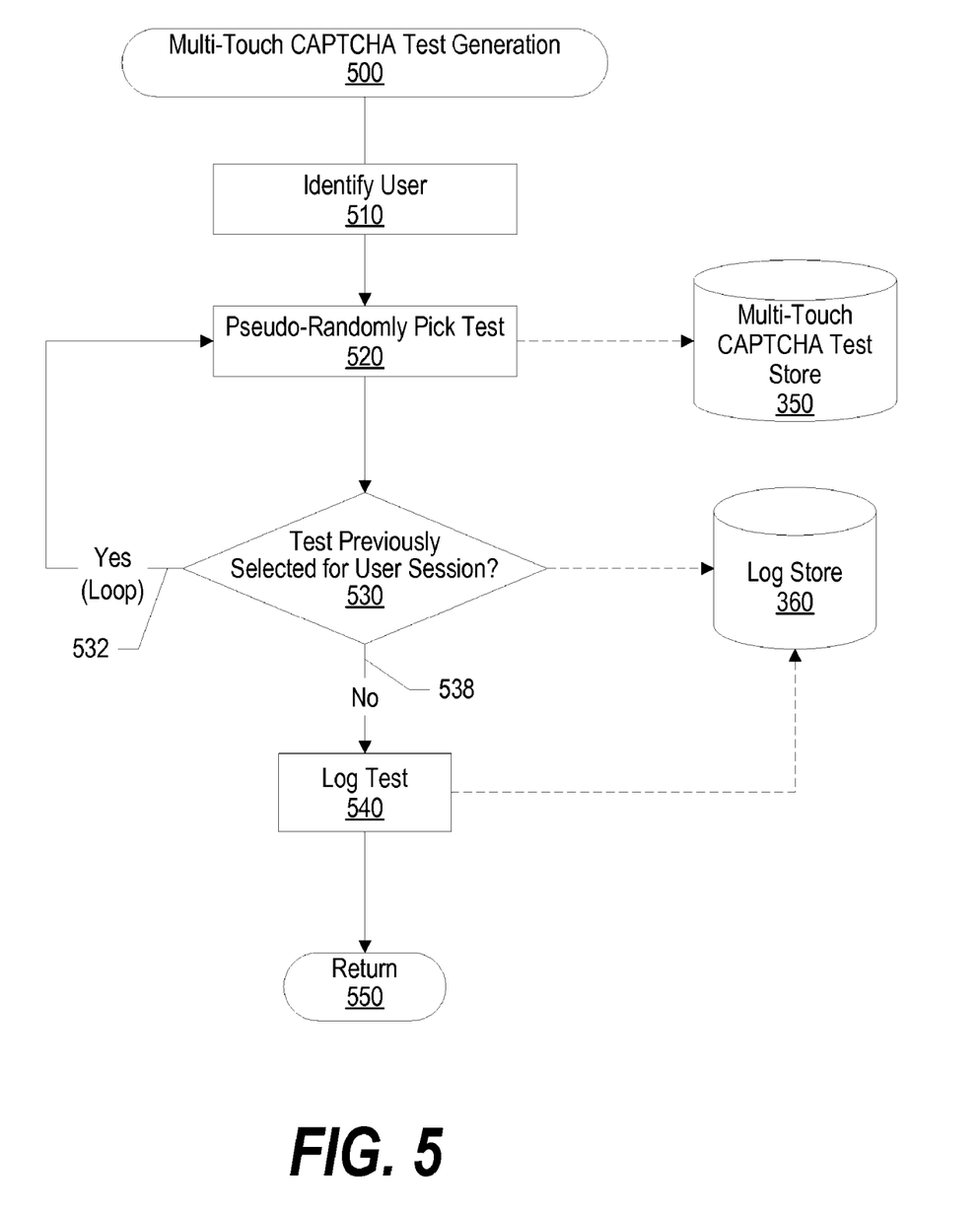
FIG. 5 is a flowchart showing steps taken in a server selecting a multi-touch test to provide to a multi-touch device.

FIG. 5 is a flowchart showing steps taken in a server selecting a multi-touch test to provide to a multi-touch device. Processing commences at 500, whereupon processing identifies the requesting user at step 510. For example, a sever may support hundreds/thousands of requests and, in this example, the server may track requests based upon a user identifier or a device identifier (e.g., IP address, etc.).

At step 520, processing pseudo-randomly selects a multi-touch test from multi-touch test store 350. Each multi-touch test instructs a user to perform an action that requires the user to simultaneously contact a display at multiple locations (see FIGS. 8-10 and corresponding text for further details).

A determination is made as to whether the selected test has already been provided to the user by checking a log located in log store 360 (decision 530). This is to ensure that the same multi-touch test is not sent to a user during a single authorization session. If the selected test has already been sent to the user, decision 530 branches to "Yes" branch 532, which loops back to select another multi-touch test. This looping continues until processing selects a test that has not already been sent to the user, at which point decision 530 branches to "No" branch 538 whereupon processing logs the multi-touch test in log store 360. Processing returns at 550.

FIG. 6 is a flowchart showing steps taken in a multi-touch device providing a multi-touch test to a user and receiving a multi-touch response from the user. The multi-touch device received the multi-touch test from an authorization server in response to the multi-touch device requesting a page of data, such as a web page (see FIG. 4 and corresponding text for further details).

Processing commences at 600, whereupon processing provides the multi-touch test to user 300 by displaying the multi-touch test on display 620 (step 610). In one embodiment, the multi-touch test corresponds to a CAPTCHA format. At step 630, processing receives a multi-touch response from user 300, which user 300 generates by simultaneously contacting display 620 at multiple locations. For example, user 300 may touch two points on display 620 and move inward towards an object on the display in order to zoom in on the object (see FIGS. 8-10 and corresponding text for further details).

A determination is made as to whether user 300 is finished providing a response (decision 640). For example, user 300 may select a "Complete" button, which informs the multi-touch device that user 300 is satisfied with user 300's response. If use 300 is not finished, decision 640 branches to "No" branch 642 whereupon processing loops back to receive more user input. This looping continues until user 300 is finished providing a response, at which point decision 640 branches to "Yes" branch 648 whereupon processing stores the multi-touch response in temporary store 420 (step 650). Processing returns at 660.

FIG. 7 is a flowchart showing steps taken in a server analyzing a multi-touch response and determining whether to authorize the device based upon a multi-touch answer. A server previously sent a multi-touch test to a multi-touch device and, in turn, the multi-touch device's user provided a multi-touch response. Processing commences at 700, whereupon processing identifies the multi-touch test that was sent to the user by checking log information included in log store 360 (step 710).

At step 720, processing retrieves a multi-touch answer and multi-touch answer parameters from multi-touch test store 350 that corresponds to the identified multi-touch test. The multi-touch answer parameters may specify an acceptable range of test answers. For example, a multi-touch test may instruct a user to rotate an image 90 degrees and, in this example, the multi-touch answer parameters may allow the user's multi-touch response to be between an 85-95 degree rotation.

Processing compares the multi-touch response with the multi-touch answer and multi-touch answer parameters at step 730, and a determination is made as to whether the multi-touch response passed based upon the comparison (decision 740). If the multi-touch response passed, decision 740 branches to "Yes" branch 748 whereupon processing authorizes the device at step 760, and processing returns at 770.

On the other hand, if the multi-touch response did not pass, decision 740 branches to "No" branch 742 whereupon a determination is made as to whether to provide another multi-touch test to the multi-touch device (decision 745). If processing should provide another test to the multi-touch device, decision 745 branches to "Yes" branch 746 whereupon processing increments a counter value in log store 360 to track the number of multi-touch tests that are sent to a particular user. Processing returns at 770. On the other hand, if processing should not provide another test to the multi-touch device, decision 745 branches to "No" branch 747 whereupon processing denies authorization to the multi-touch device at step 755, and processing returns at 770.

Figure 8:
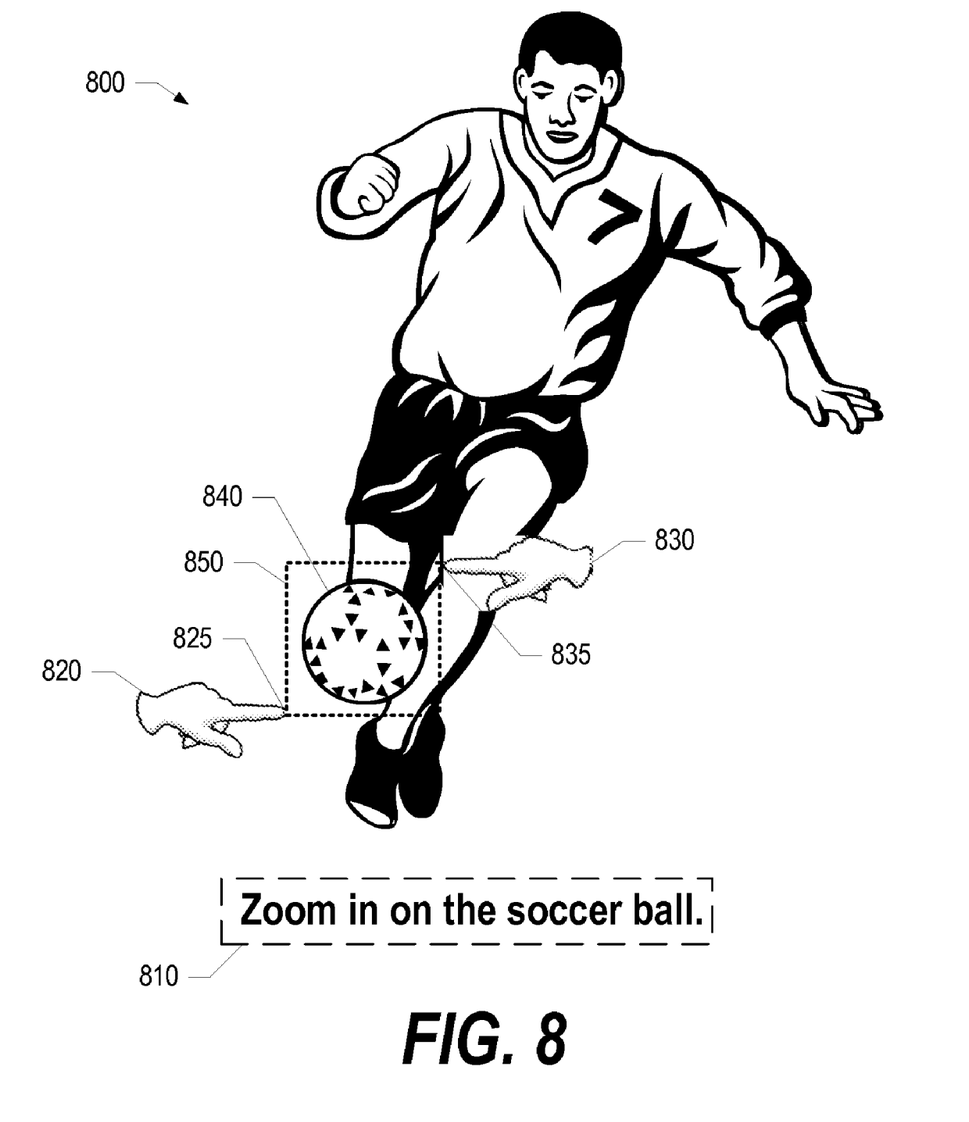
FIG. 8 is an example of a multi-touch test that a server provides to a multi-touch device.

FIG. 8 is an example of a multi-touch test that a server provides to a multi-touch device. Multi-touch test 800 includes an image and multi-touch instruction 810. As can be seen, multi-touch instruction instructs a user to zoom in on soccer ball 840.

The user's hands 820 and 830 contact a display at two points 825 and 835, respectively. The user's hands 820 and 830 may move inward towards soccer ball 840 until the user is satisfied with the zoom area. In one embodiment, a multi-touch device may display dash block 850 to assist the user in recognizing the user's selected zoom area. Once the user is satisfied with the zoom selection, the user may depress a "Complete" button. In one embodiment, the multi-touch device may automatically complete the user's selection when the user removes user's hands 820 and 830 from the display.

Figure 9:
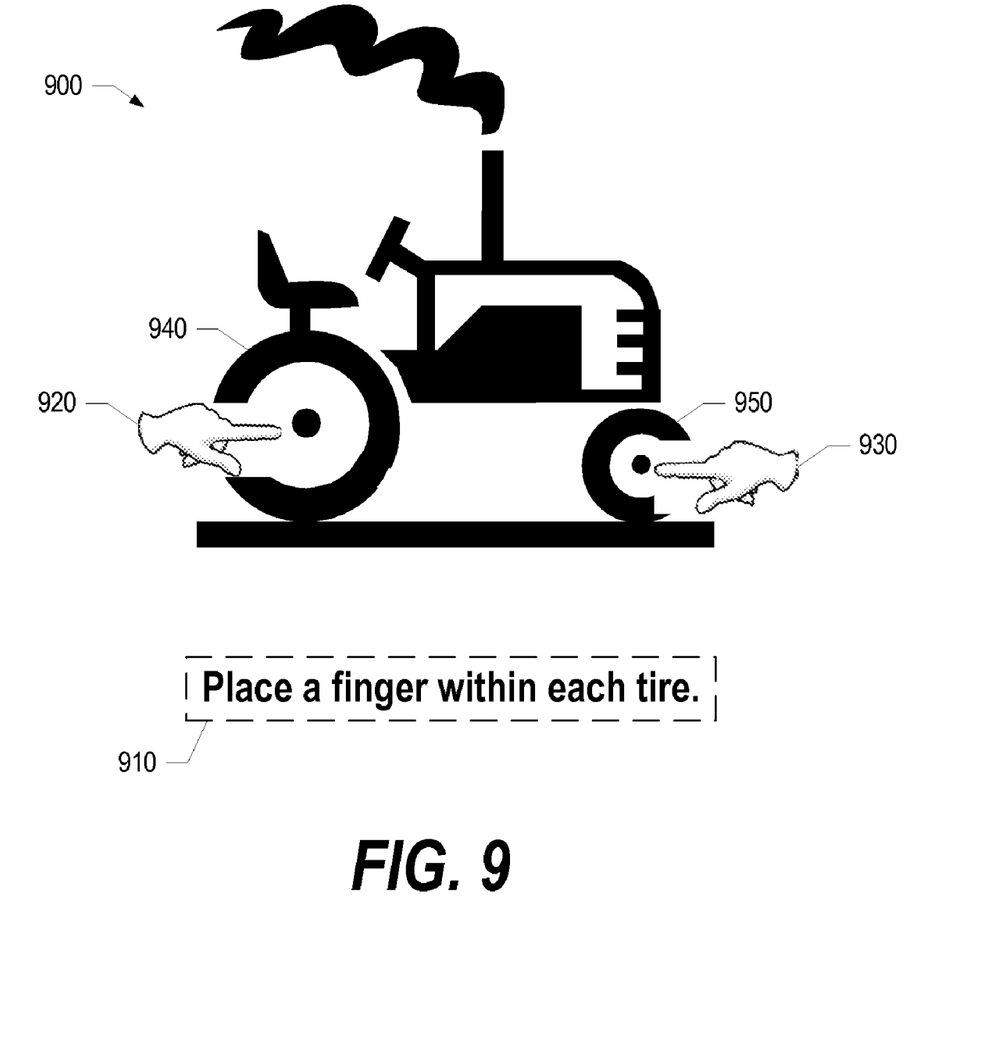
FIG. 9 is another example of a multi-touch test that a server provides to a multi-touch device.

FIG. 9 is another example of a multi-touch test that a server provides to a multi-touch device. Multi-touch test 900 includes an image of a vehicle and multi-touch instruction 910. As can be seen, multi-touch instruction instructs a user to select two locations, one of which being inside wheel 940 and another one of which being inside wheel 950.

FIG. 9 shows that the user's hands 920 and 930 contact the display within wheels 920 and 930, respectively. Once the user is satisfied with the selection, the user may depress a "Complete" button. Again, in one embodiment, the multi-touch device may automatically complete the user's selection when the user removes user's hands 820 and 830 from the display.

Figure 10:
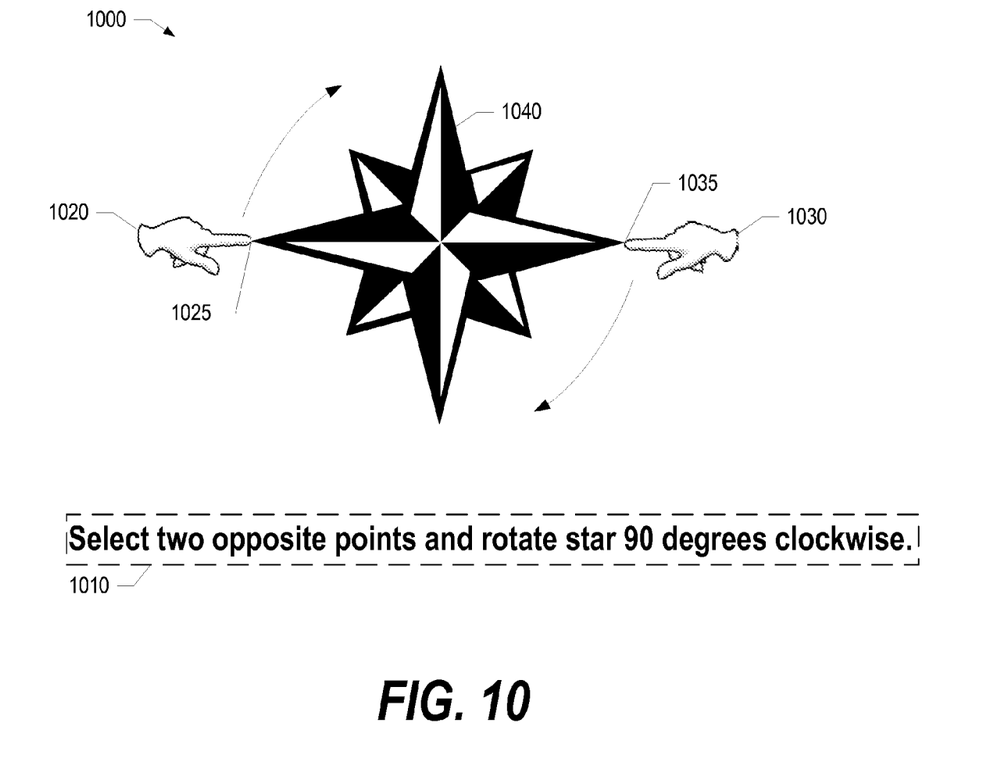
FIG. 10 is yet another example of a multi-touch test that a server provides to a multi-touch device.

FIG. 10 is yet another example of a multi-touch test that a server provides to a multi-touch device. Multi-touch test 1000 includes an image and multi-touch instruction 1010. As can be seen, multi-touch instruction instructs a user to select two opposite points of star 1040 and rotate star 1040 90 degrees in a clockwise direction.

The user's hands 1020 and 1030 contact a display at two points 1025 and 1035, respectively. The user's hands 1020 and 1030 then move in a clockwise direction 90 degrees, which subsequently rotates star 1040. Once the user is satisfied with the image rotation, the user may depress a "Complete" button. In one embodiment, the multi-touch device may automatically complete the user's selection when the user removes user's hands 1020 and 1030 from the display.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
   receiving a page request from a multi-touch device;
   providing a multi-touch test to the multi-touch device in response to receiving the page request, wherein the multi-touch test includes an image and one or more instructions that specify an action to perform on the image requiring a user to simultaneously contact a display at a plurality of locations corresponding to the image;
   receiving a multi-touch response from the multi-touch device, the multi-touch response corresponding to the multi-touch test;
   comparing the multi-touch response with a multi-touch answer for the multi-touch test; and
   authorizing the device based upon the comparison.

2. The method of claim 1 wherein the multi-touch test is based upon a Completely Automated Public Turing test to tell Computers and Humans Apart (CAPTCHA).

3. The method of claim 1 further comprising:
   retrieving multi-touch answer parameters, wherein the multi-touch answer parameters dictate an acceptable range of the multi-touch test answer;
   comparing the multi-touch response with the multi-touch answer parameters; and
   authorizing the device in response to the multi-touch response falling within the multi-touch answer parameters.

4. The method of claim 1 further comprising:
   in response to not authorizing the multi-touch device, determining whether a maximum number of multi-touch tests have been sent to the multi-touch device;
   in response to determining that a maximum number of multi-touch tests have not been sent to the multi-touch device, sending a subsequent multi-touch test to the multi-touch device.

5. The method of claim 4 further comprising:
   in response to determining that a maximum number of multi-touch tests have not been sent to the multi-touch device, selecting a second multi-touch test;
   identifying that the second multi-touch test has already been sent to the multi-touch device;
   in response to identifying that the second multi-touch test has already been sent to the multi-touch device, selecting the subsequent multi-touch test;
   identifying that the subsequent multi-touch test has not been sent to the multi-touch device; and
   sending the subsequent multi-touch test to the multi-touch device in response to identifying that the subsequent multi-touch test has not been sent to the multi-touch device.

6. The method of claim 1 wherein the multi-touch response is selected from the group consisting of zooming in on an object and rotating an object.

7. A peripheral device comprising:
   one or more processors;
   a memory accessible by at least one of the processors;
   a nonvolatile storage area accessible by at least one of the processors;
   a set of instructions stored in the memory and executed by at least one of the processors in order to perform actions of:
      receiving a page request from a multi-touch device;
      providing a multi-touch test to the multi-touch device in response to receiving the page request, wherein the multi-touch test includes an image and one or more instructions that specify an action to perform on the image requiring a user to simultaneously contact a display at a plurality of locations corresponding to the image;
      receiving a multi-touch response from the multi-touch device, the multi-touch response corresponding to the multi-touch test;
      comparing the multi-touch response with a multi-touch answer for the multi-touch test; and
      authorizing the device based upon the comparison.

8. The peripheral device of claim 7 wherein the set of instructions performs actions of:
   retrieving multi-touch answer parameters, wherein the multi-touch answer parameters dictate an acceptable range of the multi-touch test answer;
   comparing the multi-touch response with the multi-touch answer parameters; and
   authorizing the device in response to the multi-touch response falling within the multi-touch answer parameters.

9. The peripheral device of claim 7 wherein the set of instructions performs actions of:
   in response to not authorizing the multi-touch device, determining whether a maximum number of multi-touch tests have been sent to the multi-touch device;
   in response to determining that a maximum number of multi-touch tests have not been sent to the multi-touch device, sending a subsequent multi-touch test to the multi-touch device.

10. The peripheral device of claim 9 wherein the set of instructions performs actions of:
    in response to determining that a maximum number of multi-touch tests have not been sent to the multi-touch device, selecting a second multi-touch test;
    identifying that the second multi-touch test has already been sent to the multi-touch device;
    in response to identifying that the second multi-touch test has already been sent to the multi-touch device, selecting the subsequent multi-touch test;
    identifying that the subsequent multi-touch test has not been sent to the multi-touch device; and
    sending the subsequent multi-touch test to the multi-touch device in response to identifying that the subsequent multi-touch test has not been sent to the multi-touch device.

11. A computer program product stored in a non-transitory computer readable storage medium, comprising functional descriptive material that, when executed by an information handling system, causes the information handling system to perform actions that include:
    receiving a page request from a multi-touch device;

providing a multi-touch test to the multi-touch device in response to receiving the page request, wherein the multi-touch test includes an image and one or more instructions that specify an action to perform on the image requiring a user to simultaneously contact a display at a plurality of locations corresponding to the image;

receiving a multi-touch response from the multi-touch device, the multi-touch response corresponding to the multi-touch test;

comparing the multi-touch response with a multi-touch answer for the multi-touch test; and authorizing the device based upon the comparison.

12. The computer program product of claim 11 wherein the information handling system further performs actions that include:

retrieving multi-touch answer parameters, wherein the multi-touch answer parameters dictate an acceptable range of the multi-touch test answer;

comparing the multi-touch response with the multi-touch answer parameters; and authorizing the device in response to the multi-touch response falling within the multi-touch answer parameters.

13. The computer program product of claim 11 wherein the information handling system further performs actions that include:

in response to not authorizing the multi-touch device, determining whether a maximum number of multi-touch tests have been sent to the multi-touch device;

in response to determining that a maximum number of multi-touch tests have not been sent to the multi-touch device, sending a subsequent multi-touch test to the multi-touch device.

14. The computer program product of claim 13 wherein the information handling system further performs actions that include:

in response to determining that a maximum number of multi-touch tests have not been sent to the multi-touch device, selecting a second multi-touch test;

identifying that the second multi-touch test has already been sent to the multi-touch device;

in response to identifying that the second multi-touch test has already been sent to the multi-touch device, selecting the subsequent multi-touch test;

identifying that the subsequent multi-touch test has not been sent to the multi-touch device; and sending the subsequent multi-touch test to the multi-touch device in response to identifying that the subsequent multi-touch test has not been sent to the multi-touch device.

* * * * *